June 2, 1964  R. A. JOHNSON  3,135,933
"M" DERIVED MECHANICAL FILTER
Filed July 26, 1962  5 Sheets-Sheet 1
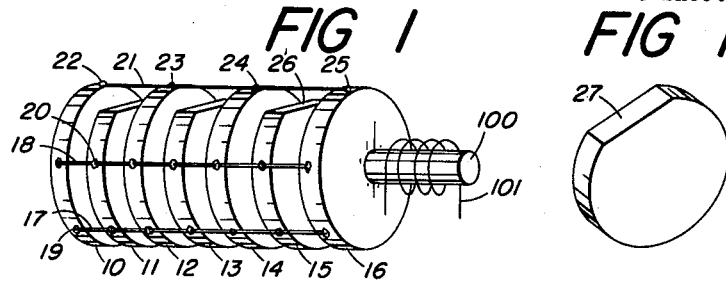
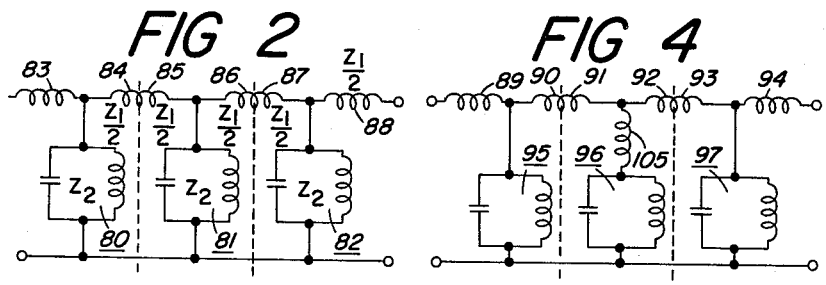
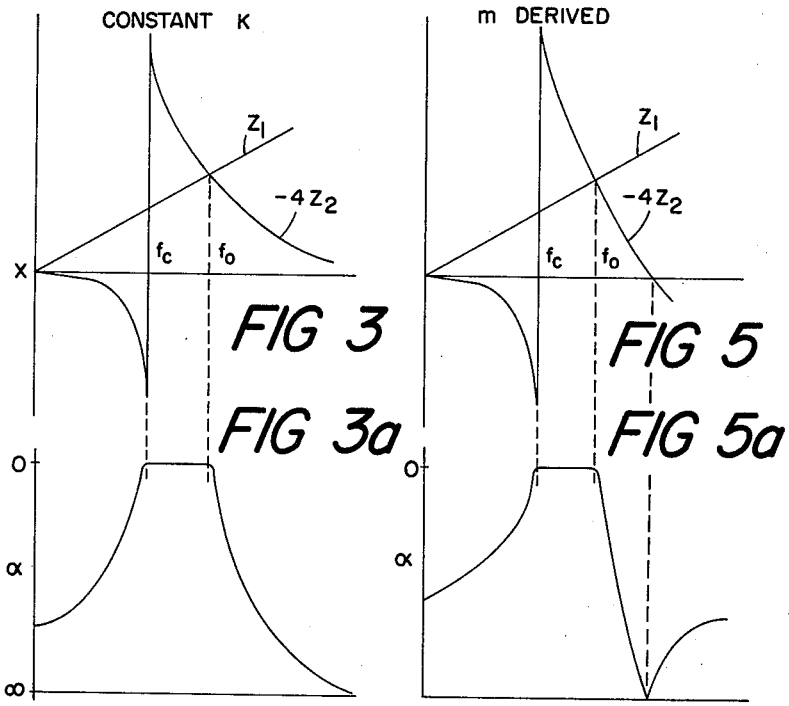
INVENTOR.
Robert A. Johnson
BY Moody and Phillion
Attorneys June 2, 1964   R. A. JOHNSON   3,135,933
"M" DERIVED MECHANICAL FILTER
Filed July 26, 1962   5 Sheets-Sheet 2

INVENTOR.
Robert A. Johnson
BY *Moody and Phillips*
Attorneys

June 2, 1964  R. A. JOHNSON  3,135,933
"M" DERIVED MECHANICAL FILTER
Filed July 26, 1962  5 Sheets-Sheet 3

INVENTOR.
Robert A. Johnson
BY *Moody and Phillion*
Attorneys

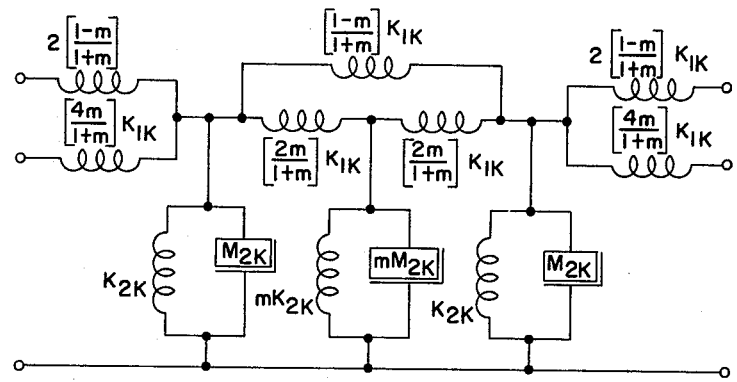
FIG 13
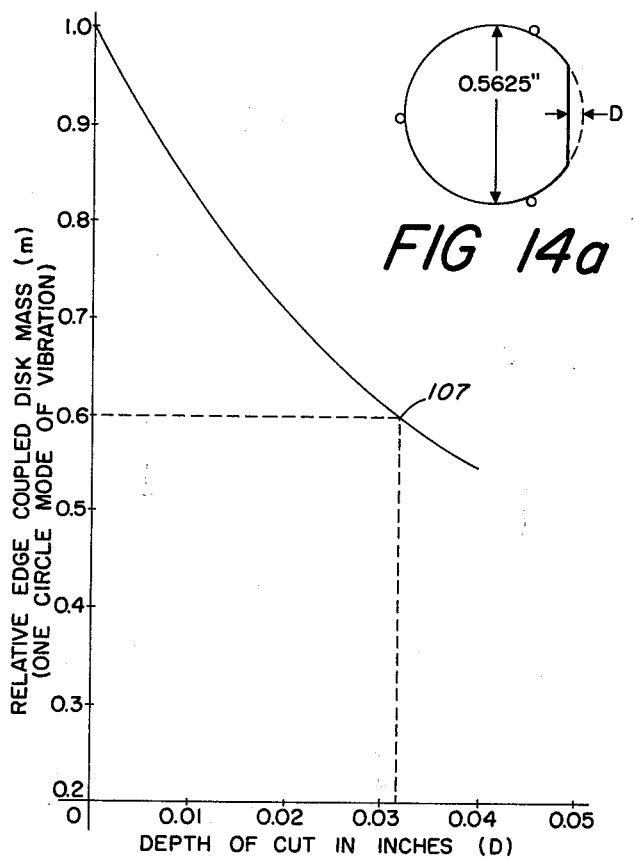
FIG 14a
FIG 14

June 2, 1964

R. A. JOHNSON 3,135,933

"M" DERIVED MECHANICAL FILTER

Filed July 26, 1962

INVENTOR.
Robert A. Johnson
BY *Moody and Phillips*
Attorneys

United States Patent Office 3,135,933
Patented June 2, 1964

3,135,933
"M" DERIVED MECHANICAL FILTER
Robert A. Johnson, Tustin, Calif., assignor to Collins Radio Company, Cedar Rapids, Iowa, a corporation of Iowa
Filed July 26, 1962, Ser. No. 212,530
9 Claims. (Cl. 333—71)

This invention relates generally to mechanical filters and, more particularly, to a mechanical bandpass filter whose equivalent circuit is that of an "$m$" derived bandpass filter.

There are in the prior art many types of mechanical filters. However, most of these mechanical filters are of the constant K variety which exhibit a somewhat symmetrical amplitude response characteristic. The networks of the constant K variety that will be discussed herein are actually modified constant K networks sometimes known as upper peaked, shunt derived, three element half-sections. Such networks shall for brevity, be called constant K networks to differentiate them from the "$m$" derived type.

It has been well known in the art for a long time that lumped constant filters of the "$m$" derived type provide additional selectivity on either the high or low frequency side of the filter response simply by having the "$m$" derived sections tuned to have either a zero shunt or infinite series impedance at frequencies, either above or below the cutoff frequencies of the filter. It would mark a definite improvement in the art to provide a mechanical filter which has properties similar to that of the "$m$" derived electrical lumped constant filter.

It is an object of this invention to provide a mechanical filter whose equivalent circuit is that of an "$m$" derived lumped constant filter.

It is a further object of the invention to provide a mechanical filter with a maximum attenuation on the high frequency side of the upper cutoff frequency point of the bandwidth of the filter.

It is a further object of the invention to improve mechanical filters generally.

It is well known in the art that the individual disks of the mechanical filter can be coupled together by coupling wires secured to the perimeters of the disks. An equivalent circuit can be drawn for the mechanical filter consisting of a series of T networks cascaded together. The stem of the T represents the disk and can be composed of a parallel combination of a capacitor and an inductor. The capacitor represents the mass of the disk with the inductor being inversely proportional to the stiffness of the disk. The coupling wires that couple together adjacent disks are represented by inductors which form the cross of the T.

In accordance with the present invention, alternate disks are connected together by bridging coupling wires, in addition to the conventional coupling wires which couple together adjacent disks, to provide an equivalent inductance between alternate disks. The intermediate disks between said alternately coupled disks are segmented in that an edge of their perimeter is milled off to produce a flattened area. Such flattened area performs two functions. Firstly, it assures no contact between the bridging coupling wire and the intermediate disks. Secondly, and most important, the flattened disks have an equivalent mass and therefore an equivalent impedance which is different from that of a circular or non-segmented disk. By proper circuit transformations it will be shown in the specification that the equivalent circuit of a mechanical filter thus formed can be the circuit of an "$m$" derived lumped constant filter.

It is to be noted that other objects and features of the invention, in addition to those mentioned above, will become more apparent from the following detailed description thereof when read in conjunction with the drawings in which:

FIG. 1 shows a perspective view of the mechanical filter;

FIG. 1a shows a single disk with a portion of the perimeter removed;

FIG. 2 shows a circuit diagram of a constant K type filter;

FIGS. 3 and 3a show the impedance and amplitude response characteristic curves of the circuit of FIG. 2;

FIG. 4 shows a circuit diagram of a filter containing one "$m$" derived stage;

FIGS. 5 and 5a show curves representing the impedance and amplitude response characteristics of the circuit of FIG. 4;

Figure 15:
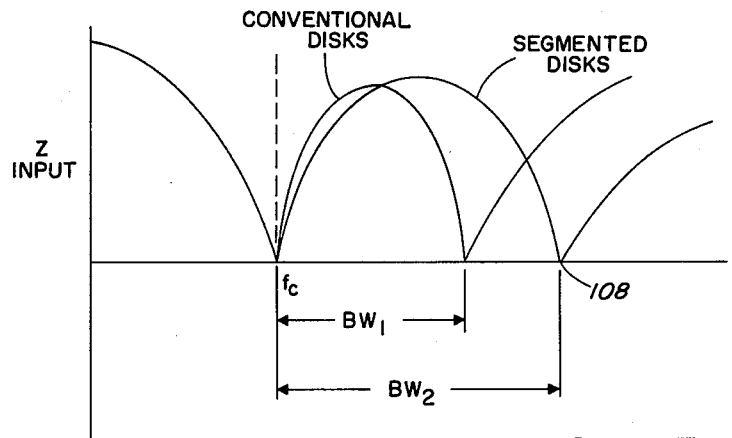
Figure 15A:
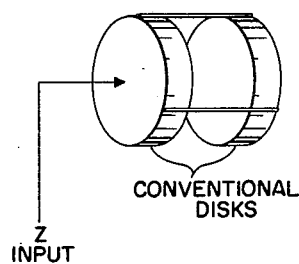
Figure 15B:
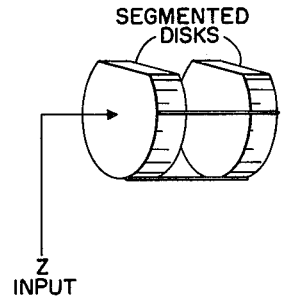

FIGS. 9, 10, 11, 12, and 13 show block diagrams and schematic diagrams of circuit transformation concomitant to the analogy of the mechanical "$m$" derived filter in terms of the equivalent "$m$" derived filter circuit;

FIGS. 14 and 14a show the relationship between the value of $m$ and the depth of cut required in a disk for a specified value of $m$;

FIG. 15 shows the relationship of the frequency response characteristics of segmented and nonsegmented disks; and FIGS. 15a and 15b show specific examples of conventional and nonconventional disks.

In describing this invention the structure of FIG. 1 will first be described, generally, and then the equivalent circuit thereof shown in FIG. 6 will be discussed briefly. Subsequently, a discussion of "K" derived and "$m$" derived filters as represented by the circuits of FIGS. 2 and 4 will be discussed briefly to give the reader a background which will better enable his to understand the invention. Subsequently, the transformations required to transform the equivalent circuit of FIG. 6 into the "$m$" derived equivalent circuit form of FIG. 8 will be discussed. Next, a discussion will be made of the detailed manner in which the disks of the mechanical resonator of FIG. 1 are cut to provide the reactances which are necessary to produce the "$m$" derived filter function.

Figure 8:
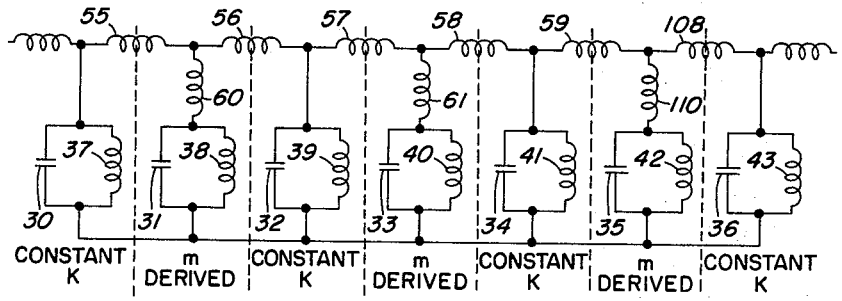
FIG. 8 shows a schematic circuit which is the equivalent circuit of the circuit of FIG. 6 after certain transformations have been made thereon.

Referring now to FIG. 1, the mechanical resonator shown therein is comprised of disks 10, 11, 12, 13, 14, 15, and 16, which are connected together by coupling wires, such as coupling wires 17 and 18. Said coupling wires are welded to each of the disks 10 through 16 at spots such as weld spots 19 and 20 on disks 10 and 11. A third coupling wire shown in FIG. 1 is identified by the reference character 21 and functions to couple together every alternate disk, such as disks 10, 12, 14, and 16. The disks 11, 13, and 15 are not connected to this coupling wire 21. Rather, the disks 11, 13, and 15 are shaped somewhat differently, having a portion of the perimeter removed, leaving a flat spot, such as the flat spot 26 of disk 15. The reasons for removing this portion of the disks 11, 13, and 15 are two-fold. First, it permits the coupling wire 21 to pass thereacross without touching. Secondly, it changes the resonant characteristics of the disk so as to produce the desired reactance necessary to have an equivalent "$m$" derived electrical circuit, such as shown in FIG. 8.

The mechanical resonator of FIG. 1 is driven by transducer 100 which may be a ferrite rod connected to the disk 16 and having wound thereon a winding 101 to which the input signal is applied. In FIG. 1a there is shown a single disk having a portion of the perimeter removed, thus providing a flat surface 27.

Refer now to the circuits of FIGS. 2 and 4, there is shown, respectively, a constant "K" three-stage filter and a filter having two constant "K" stages and one "m" derived stage. Specifically, the center stage of the filter of FIG. 4 is an "m" derived stage.

Referring to FIG. 3, there is shown the series and shunt arm reactance curves of the filter of FIG. 2. As is well known in filter theory, the frequency pass band is determined by two conditions. One is when $$\frac{Z_1}{Z_2}$$

is equal to 0, and the second one is when $Z_1$ is equal to $-4Z_2$. The first condition, i.e., when $$\frac{Z_1}{Z_2}$$

is equal to 0, is determined at the frequency $f_c$ when $Z_2$ becomes infinite. The second point occurs at frequency $f_0$ when the curve $-4Z_2$ crosses the curve $Z_1$. It will be observed that the curve $-4Z_2$ approaches the X axis asymptotically and theoretically never does reach it.

The function of the "m" derived filter is to provide sharp attenuation peaks just beyond the upper frequency cutoff point of the filter bandwidth. Thus, the inductor 105 and the tuned circuit 96 of the center "m" derived stage of FIG. 4 is designed such that at some frequency just above the upper frequency cutoff of the filter bandwidth, the said inductor 105 and tuned circuit 96 will form a series-tuned circuit, thus shunting the applied signal therethrough and providing a large attenuation of the output signal. With an "m" derived filter the curve $-4Z_2$ crosses the X axis, as shown in FIG. 5, rather than approaching it asymptotically. The result is a sharper cutoff on the upper frequency limit of the frequency bandwidth and also a reduction of spurious signals on the upper side of said bandwidth. Briefly, the improved attenuation can be accomplished most effectively by having a number of "m" derived filter stages, each of which has an attenuation peak at a slightly different frequency, with all of said frequencies lying above the upper frequency cutoff of the filter bandwidth. This phenomena will be discussed at somewhat greater length in connection with the operating curves of the mechanical filter of FIG. 1 later herein.

In FIG. 2 the tuned circuits 80, 81, and 82 represent an impedance $Z_2$; whereas, each of the impedances 83 through 88 represent an impedance $$\frac{Z_1}{2}$$

In FIG. 4 the first stage, including impedances 89, 90, and 95 is a constant "K" stage as is the last stage which includes impedances 93, 94, and 97. As mentioned above, the center stage, including impedances 91, 92, 105, and 96 consistutes an "m" derived stage. For a detailed discussion of "m" derived filters, any standard textbook on filters may be consulted.

Figure 6:
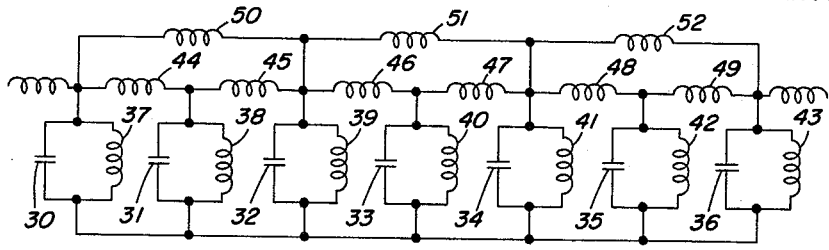
FIG. 6 shows an equivalent lumped constant circuit which is the equivalent circuit of the disk and wire portion of the "$m$" derived mechanical filter of FIG. 1.

Referring now to the circuit of FIG. 6, there is shown an equivalent circuit of the mechanical filter of FIG. 1. Specifically, the following analogies are true. The capacitors 30 through 36 are equivalent to the masses of the disks 10 through 16 of the circuit of FIG. 1. The inductors 37 through 42 represent the compliance (reciprocal of stiffness) of each of the disks 10 through 16 and thus are inversely proportional in value to the said stiffness of said disks. The inductors 44 through 49 represent the coupling wires between the disks and, more specifically, the compliance of the coupling wires between the disks. For example, the inductor 45 represents the compliance of those portions of the coupling wires existing between disk 11 and disk 12. In the drawing of FIG. 1 such coupling wires would include wires 17 and 18, but would not include wire 21 since disk 11 is not coupled to disk 12 by coupling wire 21. The inductors 50, 51, and 52 represent the coupling between alternate disks and specifically refer to the coupling wire 21, which joins together disks 10, 12, 14, and 16. Thus, the circuit of FIG. 6 is the electrical equivalent of the mechanical structure of FIG. 1.

Figures 7, 7A:
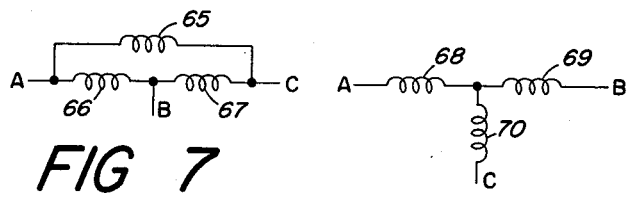
FIGS. 7 and 7a show circuit transformations.

FIGS. 7 and 7a show circuits which are electrically equivalent to each other. In other words, the delta circuit of FIG. 7 consisting of inductors 65, 66, and 67 can be transformed by well-known means to the Y configuration of FIG. 7a, which comprises inductors 68, 69, and 70. Applying such transformations to the circuit of FIG. 6 will produce the circuit of FIG. 8. More specifically, the circuit including inductors 55, 56, and 60 of FIG. 8 is the equivalent circuit of the delta circuit of FIG. 6, including inductors 44, 45, and 50. Similarly, the Y circuit including inductors 57, 58, and 61, of FIG. 8 is the electrical equivalent of the delta circuit including inductors 46, 47, and 51 of FIG. 6. Also, the Y circuit including inductors 59, 108, and 110 of FIG. 8 is the electrical equivalent of the delta circuit of FIG. 6, including inductors 48, 49, and 52.

A comparison of the circuit of FIG. 8 and the circuit of FIG. 6 will show that the circuit of FIG. 6 contains three "m" derived sections therein which are labeled in the circuit itself. The other sections, namely the first and third sections, and the fifth section and seventh section of the circuit of FIG. 8 are constant "K" sections and are similar to the constant "K" sections of FIGS. 2 and 4.

Since we now have obtained an equivalent circuit which contains "m" derived sections, it is now only necessary to design the disks and the coupling wires of the filter of FIG. 1 to produce the equivalent mechanical reactances which are necessary to satisfy the requirements for an "m" derived circuit. It is well known in filter circuit theory that the reactances of the "m" derived stages bear a definite relationship to the reactances of the constant "K" stages and this relationship is usually expressed in terms of "m" and the impedances of the constant "K" sections.

In the following paragraphs the specific design criteria necessary to produce proper mechanical reactances will be discussed.

Figure 9:
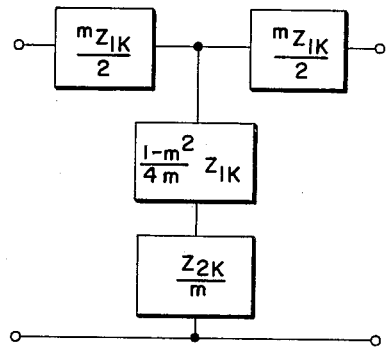

The basic "m" derived electrical wave filter is composed of T sections of the general form shown in the block diagram of FIG. 9. When cascaded with constant K sections, or modified constant K sections, as employed in mechanical filters, the network of FIG. 10 is obtained wherein an "m" derived section is shown inserted between two constant K sections similar to the schematic arrangement of the circuit of FIG. 4.

Figure 10:
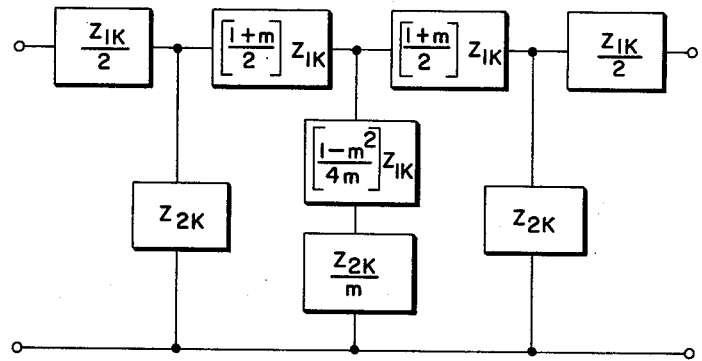
Figure 11:
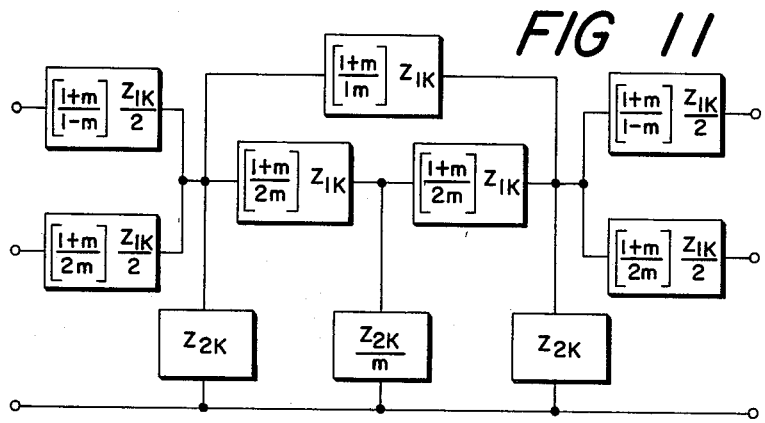

Because a Y network can be converted to a delta equivalent, the block diagram of FIG. 10 may be redrawn as the circuit shown in FIG. 11. It is to be noted that the $$\frac{Z_{1k}}{2}$$

arms of the structure of FIG. 10 have been redrawn as two parallel impedances $$\left[\frac{1+m}{1-m}\right]\frac{Z_{1k}}{2} \qquad (1)$$

$$\left[\frac{1+m}{2}\right]\frac{Z_{1k}}{2} \qquad (2)$$

It will be shown later that the impedances set forth immediately above are analogous to bridging and conventional coupling wires, respectively, such as shown in the structure of FIG. 1.

Figure 12:
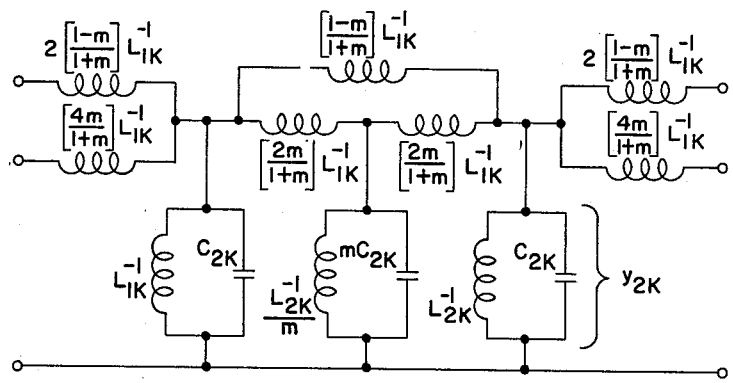

By substituting reactive components in the place of the Z's of the structure of FIG. 11, there is obtained a band pass filter as shown in the schematic diagram of FIG. 12 which, as can be seen, is similar to the circuit of FIG. 6, except that FIG. 6 has three "$m$" derived sections alternately interpositioned with four constant K sections. The circuit of FIG. 12 is drawn on a node or admittance basis. Since the stiffness of the coupling wires is inversely proportional to the equivalent inductance inherent therein and also to the fact that the mass of the disk is directly proportional to the equivalent capacitance thereof of an electrical circuit, the admittance expressions of FIG. 12 are, of course, inversions of the impedance expressions of FIG. 11.

If differential equations describing both the electrical circuit of FIG. 12 and its analogous mechanical network are formulated on a node basis, the following quantities would be considered to be analogous:

Force ($f$) and Current (I)
Velocity ($\sqrt{}$) and Voltage (V)
Mass (M) and Capacitance (C)
Stiffness ($k$) and Inverse Inductance ($L^{-1}$)
Resistance ($b$) and Conductance (G)

Both the electrical circuit and the mechanical network are being described herein by node concepts, and their geometric pattern will be identical and can be represented by the network of FIG. 13 wherein K has been substituted for $L^{-1}$ and mass which is represented by the letter M, has been substituted for capacitance.

It will be observed in the diagram of FIG. 13 that the ratio of the equivalent mass of the segmented disk to the equivalent mass to the nonsegmented disk is equal to $m$ as can be seen from the following expression:

$$\frac{mM_{2k}}{M_{2k}} = m \qquad (3)$$

Since the cross-sectional areas of both the bridging and the conventional coupling wires are proportional to their impedances, the cross-sectional area of the bridging coupling wire should bear a relationship to the total cross-section area of the conventional coupling wires as shown by the following expression:

$$\frac{2\left[\frac{1-m}{1+m}\right]K_{1k}}{\left[\frac{4m}{1+m}\right]K_{1k}} = \frac{1-m}{2m} \qquad (4)$$

Thus, in FIG. 1 if it is desired that $m$ be .6, for example, the cross-sectional area of the bridging coupling wire 21 should be one-third the total cross-sectional area of all the conventional coupling wires, such as coupling wires 20 and 17.

In FIG. 14 there is shown a curve showing the relationship between equivalent mass and the depth of cut for a particular disk. For example, assume that it is desired to have an "$m$" derived mechanical filter wherein the value of $m$ is .6. Looking at the curve of FIG. 14, it can be seen that the point 107 corresponds to such value of $m$. The depth of cut "D" as defined in FIG. 14a to produce the proper equivalent mass is then taken from the abscissa, and for the particular example assumed, would be 0.032 inch, assuming the disk to have a diameter of .5625 inch. It is to be understood that the curve of FIG. 14 is compiled empirically from a particular disk having specific dimensions. If a new design of mechanical filter is made employing disks of different dimensions, then a new empirical curve must be derived.

In obtaining the curve of FIG. 14 the following relationships are considered. It is well-known mechanical filter theory that the following relationship exists:

$$\frac{Z_w}{Z_{cd}} \cong \frac{BW_1}{f_c} \qquad (5)$$

Where $Z_w$ is the impedance of conventional coupling wires and $Z_{cd}$ is the impedance of the circular or nonsegmented disk, $BW_1$ is the bandwidth of a two nonsegmented disk-coupling wire combination, as shown in FIGS. 15 and 15a and $f_c$ is the frequency of the disks which corresponds to the lower cutoff frequency of the filter.

The following relationship is also true:

$$\frac{Z_w}{Z_{sd}} \cong \frac{BW_2}{f_c} \qquad (6)$$

Where $Z_{sd}$ is the impedance of the segmented disk and $BW_2$ is the bandwidth of the segmented disk-wire combination, as shown in FIGS. 15 and 15b, it should be noted that coupling wire cross-sectional area and disk frequencies are the same as in the nonsegmented case. From the Expressions 3, 5, and 6 the following expression can be derived:

$$\frac{Z_{sd}}{Z_{cd}} = \frac{mM_{2k}}{M_{2k}} = \frac{BW_1}{BW_2} = m \qquad (7)$$

Thus, by testing the individual disks in a proper testing equipment to determine their frequency bandwidth, the value of $m$ can be determined for different milling depths of the perimeter of the disk. A curve, such as shown in FIG. 14, can then be prepared from the empirical data and utilized for design purposes.

Equivalent mass, as employed herein, as defined herein is the coefficient which, when multiplied by $2\pi$ times the frequency, gives the positive imaginary part of the mechanical impedance of the disk.

Another way of stating the above is that the equivalent mass is the coefficient of the lumped mass which is equivalent to the measured value of mass ($Z/2\pi f$) at a point on a distributed system.

Thus, if it takes the same effort to shove the edge of a disk as it takes to shove a point (lumped) mass of a certain value, then the equivalent mass at the edge of the disk is equal to that of the lumped mass, assuming that the stiffness of the disk is not a factor as is the case at frequencies a great deal above resonance.

It is to be noted that the form of the invention herein shown and described is but a preferred embodiment thereof and that various changes in mechanical configurations can be made without departing from the spirit or the scope of the invention.

I claim:

1. Mechanical filter means comprising a plurality of first and second disks having substantially equal resonant frequencies, said disks being spaced apart and having their axes lie along a common straight line, first coupling rod means rigidly coupling together adjacent ones of said disks, each of said second disks being segmented by having a portion of its mass removed to cause its equivalent mass to bear a ratio "$m$" to the equivalent mass of said first disks from which no mass has been removed, bridging coupling rod means coupling together the disks on either side of each of said second disks from which a portion of its mass has been removed, the total cross-sectional area of the bridging coupling rod means bearing a ratio $$\frac{1-m}{2m}$$

to the total cross-sectional area of the first coupling rod means.

2. Mechanical filter means in accordance with claim 1 in which the portion removed from each of said second disks is removed from the periphery thereof leaving a flat surface on said periphery, and in which said first said bridging coupling rod means are secured to the perimeters of the disks, said bridging coupling rod means being positioned to pass over the segmented portion of said second disks.

3. Mechanical filter means in accordance with claim 2 in which the impedance $Z_{sd}$ of a segmented disk bears a ratio "$m$" to the impedance $Z_{cd}$ of one of said first disks.

4. Mechanical filter means comprising a plurality of first and second disks having substantially the same resonant frequency and spaced apart a predetermined distance with their axes laying on a common straight line, each of said second disks being separated from any other second disk by at least one of said first disks, first coupling means comprising first rod-like elements rigidly secured to said first and second disks to maintain the aforesaid spacing between said disks and to transmit energy between said disks, each disk of said second disks having a segment of its mass removed therefrom, bridging coupling means comprising second rod-like elements rigidly secured to the disks on either side of each of said second disks, each of said second disks being disconnected from any of said second rod-like elements, the relative masses of said first and second disks and the relative cross-sectional areas of said first and second rod-like elements being selected to produce a mechanical filter whose electrical equivalent contains "$m$" derived stages with each segmented disk comprising a corresponding mechanical "$m$" derived stage.

5. Mechanical filter means in accordance with claim 4 in which the portion removed from each of said second disks is removed from the periphery thereof, leaving a flat surface on said periphery, and in which the rod-like elements of said first and bridging coupling means are secured to the perimeters of the disks, the rod-like elements of said bridging coupling means being positioned to pass over the segmented portion of said second disks.

6. Mechanical filter means in accordance with claim 5 in which the impedance $Z_{sd}$ of a segmented disk bears a ratio "$m$" to the impedance $Z_{cd}$ of one of said first disks.

7. Mechanical filter means in accordance with claim 4 in which the equivalent mass of each of said second disks bears a ratio "$m$" to the equivalent mass of each of said first disks, and in which the total cross-sectional area of the bridging coupling means between first disks positioned on either side of a given one of said second disks bears a ratio $$\frac{1-m}{2.m}$$

to the total cross-sectional area of the first coupling means coupling together said given second disk and an adjacent first disk.

8. Mechanical filter means in accordance with claim 7 in which the portion removed from each of said second disks is removed from the periphery thereof, leaving a flat surface on said periphery, and in which the rod-like elements of said first and bridging coupling means are secured to the perimeters of the disks, the rod-like elements of said bridging coupling means being positioned to pass over the segmented portion of said second disks.

9. Mechanical filter means in accordance with claim 8 in which the impedance $Z_{sd}$ of a segmented disk bears a ratio "$m$" to the impedance $Z_{cd}$ of one of said first disks.

References Cited in the file of this patent
UNITED STATES PATENTS

| | | |
|---|---|---|
| 2,808,572 | Ibsen | Oct. 1, 1957 |
| 2,829,350 | Ibsen | Apr. 1, 1958 |
| 2,930,006 | Hathaway | Mar. 22, 1960 |
| 2,981,905 | Mason | Apr. 25, 1961 |